United States Patent
Pomeroy

(10) Patent No.: US 6,596,074 B2
(45) Date of Patent: Jul. 22, 2003

(54) CEMENTITIOUS PRODUCT WITH PHOSPHORESCENSE

(75) Inventor: Robert S. Pomeroy, Ft. Lauderdale, FL (US)

(73) Assignee: Southern Grouts and Mortars, Inc., Pompano Beach, FL (US)

( * ) Notice: Subject to any disclaimer, the term of this patent is extended or adjusted under 35 U.S.C. 154(b) by 0 days.

(21) Appl. No.: 09/909,071

(22) Filed: Jul. 20, 2001

(65) Prior Publication Data

US 2003/0051638 A1 Mar. 20, 2003

(51) Int. Cl.$^7$ ............................................... C04B 14/00
(52) U.S. Cl. ...................... 106/712; 106/718; 106/724; 106/735; 106/737; 106/741; 106/803; 106/401; 106/442; 106/461
(58) Field of Search ................................ 106/712, 718, 106/724, 735, 737, 803, 812, 401, 426, 444, 442, 461, 741

(56) References Cited

U.S. PATENT DOCUMENTS

| | | |
|---|---|---|
| 4,172,063 A | 10/1979 | O'Brill |
| 5,271,754 A * | 12/1993 | Baurecker et al. ........... 65/18.4 |
| 5,314,536 A | 5/1994 | Kawasaki |
| 5,374,377 A * | 12/1994 | Nguyen et al. ........ 252/301.36 |
| 5,424,006 A * | 6/1995 | Murayama et al. ... 252/301.4 R |
| 5,849,218 A | 12/1998 | Johansen, Jr. |
| 5,874,491 A * | 2/1999 | Anders ....................... 523/457 |
| 5,951,752 A | 9/1999 | Johansen, Jr. |
| 6,005,024 A | 12/1999 | Anders |

FOREIGN PATENT DOCUMENTS

FR          1421890        * 12/1965

* cited by examiner

Primary Examiner—Paul Marcantoni
(74) Attorney, Agent, or Firm—Oltman, Flynn & Kubler

(57) ABSTRACT

The present invention pertains to the use of phosphorescent pigments in cementious materials and allied applications, specifically in use for tile mortars and grouts, pool plasters, wall plasters, cementious roofing materials, cementious surface coatings, cement patches and self leveling compounds. The material will luminesce in the absence of an external source after irradiation with sunlight, visible, ultra-violet (UV) and/or infrared radiation without any degradation in the integrity of the cementious materials from their original applications. The cementious materials need to be capable of being applied by trowel, brush, or spray, forming a strong bond to the surface to which it has been applied. The phosphorescent material should be insoluble in water, compatible with cementious materials, remain fixed in the cementious material, effective at high pH, and produce a long lasting luminescence, for up to 8 to 12 hours, in the visible portion of the spectrum after exposure to a radiation source. So long as the material is exposed to sunlight, no other source of radiation is required. The cementious materials shall be both functional and aesthetically pleasing under normal visible light conditions and in the absence of source excitation, the material will glow in the visible portion of the spectrum, providing light for aesthetic effect and/or safety considerations.

13 Claims, No Drawings

CEMENTITIOUS PRODUCT WITH PHOSPHORESCENSE

FIELD OF THE INVENTION

This invention involves the incorporation of a phosphorescent pigment into cementious materials used in construction, concrete restoration, surface decorations, wall and pool plasters, and tile settings materials such as mortars and grouts. These materials will luminesce after charging with electromagnetic radiation. The luminescence will persist after the charging source illumination has ceased. The duration, 8 to 12 hours after the cessation of the source radiation, and intensity of the luminescence will be great enough so that the material will glow or luminesce visibly in low light level conditions for either aesthetic effect and/or safety considerations. The incorporation of these pigments will in no way detract from the performance characteristics of the cementious materials primary function or application. The phosphorescence cementious materials will in no way present a health or environmental hazard.

BACKGROUND OF THE INVENTION

Cement based compositions enjoy broad application in construction materials, tile setting, wall and pool plasters, stucco, self leveling compounds, roofing tiles and cement patches. The addition of dyes and pigments to the cementious materials has also enjoyed wide application in all of the above mentioned materials. Phosphorescence is a specific type of luminescence in which the emission of radiation resulting from excitation of a crystalline or liquid material occurs after the excitation has ceased, and may last from a fraction of a second to hours or more. The absorbed radiation moves electrons from the lowest state, the ground state, to higher energy states known as excited states. The absorbed radiation may be simple reradiated at the same frequency or energy may be lost to the solvent or lattice and radiated at a lower frequency. In the fluorescence process, the excited electron remains in the same spin state and the relaxation time, the time between absorption and emission of radiation, is very short, on the order of $10^{-3}$ to $10^{-8}$ sec. With phosphorescence, the excited electron undergoes a "spin flip" in a process referred to as intersystem crossing. This electron is now trapped in a system in which the rapid return to the ground state is "forbidden". The key distinction is that the emission of absorbed radiation in phosphorescence can continue long after the cessation of the excitation, or source, radiation. In fluorescence, the emission is very short lived after the source excitation has been terminated. Hence, luminescence in fluorescence requires that the excitation be employed at all times, whereas luminescence from phosphorescence requires the excitation source to "charge" the material and the luminescence can be detected for long periods of time after the source excitation has stopped. The two processes are distinct both in mechanism and characteristic.

The process of phosphorescence in many materials requires the presence of heavy atoms which can be toxic, radioactive or prohibitively expensive. A new class of phosphorescent materials, rare-earth doped calcium aluminates, present unique opportunities for this invention. The rare-earth's represent nonradioactive heavy atoms with little toxicity. The key advantage of this class of phosphorescent materials is that undoped calcium aluminate is already a component of Portland cement. The content of the calcium aluminate various with the type of cement, mostly controlling the cure rate and early hardness of the cement. Calcium aluminate has very limited solubility in water and the replacement in the crystal of a rare earth metal cation for calcium further reduces the solubility. This substitution of the rare earth doped calcium aluminate for the regular calcium aluminate will result in now other change in the performance of the cement aside from the phosphorescence. The rare earth doped calcium aluminates are also stable and continue to exhibit phosphorescence in the alkaline conditions of wet cement. Many other materials phosphorescence is pH dependent. The conditions present in the preparation and application of cementious materials may well lead to partial or complete degradation of the phosphorescence with other materials.

Previous patents have described inventions similar to this proposal. In the first three related patents, fluorescence is the luminescence mechanism either by direct reference for the implication of constant source irradiation. U.S. Pat. No. 4,172,063 "Abrasion resistant Reflective Marking Composition" limited it's description to fluorescent pigments and in several places refers to the use of either head lights or black lights as an excitation sources, further reinforcing the characteristic properties of fluorescence and not phosphorescence. Also, the targeted application of the patent is in marking materials and only utilized cementious materials for their abrasion resistance and bonding ability. There is no discussion of the use of cementious materials as construction materials or coating with aesthetic appeal. U.S. Pat. No. 5,314,536 "Methods of Making Luminous Construction Materials" focuses on the preparation of luminescent materials, that is embedding luminescent chunks into cementious materials. This patent also limits its description to fluorescence and repeatedly refers to the need for a UV excitation source in order to observe the luminescence. U.S. Pat. No. 5,849,218 "Fluorescent Pool Coating" again limits its invention to fluorescent pigment and makes no mention of phosphorescence.

U.S. Pat. No. 6,005,024 "Phosphorescent Epoxy Overlay" does directly refer to phosphorescence and cites the use of rare earth doped calcium aluminates. However, the targeted application is in transparent overly materials to be used in marking applications. It specifies that the epoxy should be clear or translucent. This specification is key to that invention's use as an overlay material which would not cover existing surface markings or obscure the surface's original appearance. The material into which the phosphorescent pigment is incorporated is epoxy based material and at no time mentions cementious materials, as this would be in direct conflict with the issue of transparency. In this invention, the material should not be transparent and will actually serve as the material from which the surface will derive its appearance. The base material for this invention are cementitous and are related to the construction and tile setting industries.

Other patents (U.S. Pat. Nos. 5,424,006 and 5,665,793) are even further removed as the luminescent material is incorporated into hydrocarbon based systems such as paints. The hydrophobic nature of hydrocarbons would prohibit the inclusion of phosphorescent paints into cementious materials which are prepared for application from their dry form with water.

SUMMARY OF THE INVENTION

This invention involves the use of rare earth doped calcium aluminates as a phosphorescent pigment incorporated into a cementious matrix. The advantage of phosphorescence over fluorescence is that the sun can serve as the excitation source and after the sun has set the pigmented material will luminesce for several hours at an intensity plainly visible to the eye. The luminescence emitted can serve either a decorative or safety function. Dependent upon the manufacturing process, luminescent spanning the visible spectrum from blue to red is possible. Due to the chemical identity of the phosphorescence pigment, it can be readily incorporated into cementious material with no deleterious effects to the original function of the cementious matrix as a construction material or decorative surface preparation. Due to its insolubility in water and inertness in cementious based materials such as tile mortars and grouts, pool plasters, wall plasters, cementious roofing materials, cementious surface coatings, cement patches and self leveling compounds, the rare earth doped calcium aluminates make a unique match as a additive. The glow in the dark characteristic of phosphorescent materials eliminates the need for excitation sources like UV lamps to be operating in order to detect the luminescence. The phosphorescent pigment can be recharged, repeated, with little or no degradation of the luminescence over time. Research has shown that the phosphorescent pigment is stable in the cementious matrix whether it is in a dry setting like a concrete surface coating or in an aqueous environment like a pool plaster. The phosphorescent pigment can be incorporated into the cementious matrix directly or coated on the silica aggregate commonly used as filler in cement based preparations. The pigment is also compatible as inert filler in polymeric materials such as epoxies, acrylic and polycarbonates which are used in the modification of cementious materials to increase set strength, flexibility, chemical resistance or reduce shrinkage. These pigments are also compatible with other agents incorporated into cementious preparations to effect rheology, pumpability, air entrainment, or the growth microbes. The presence of the pigment in these crementious materials has had no effect on how the material is applied whether by brush, trowl or spray. The intensity of the luminescence is dependent upon the amount of pigment used. Pigment loads from 1 to 30% of the cementious base have been successful in giving perceivable luminescence even in low light level environments. The appearance of these pigments under visible light is a free flowing white powder or may contain some coloration. The white powders blend in with the cementious material and there is no discernible difference in the appearance of the cementious materials under visible irradiation such as sunlight. Removal of the source excitation, the lights turned off indoors or the sun setting outdoors, and the cementious materials now glows in a variety of colors dependent on the rare earth doping of the calcium aluminate.

DETAILED DESCRIPTION OF THE INVENTION

The following examples are to more fully demonstrate the invention. Minor variation of these compositions will be considered equivalent by those skilled in the art and are included within the scope of the invention.

EXAMPLE 1

Thin Set

| | |
|---|---|
| 62 | parts by weight silica sand |
| 37.2 | parts by weight Portland cement, gray or white |
| 0.2 | parts by weight ethyl cellulose ether (thickener) |
| 1 | part by weight rare earth doped calcium aluminate (phosphorescent pigment) |

Example 1 represents a typical formulation for a thin set mortar. The type of Portland cement can be any variety, the color, fineness of the grind and the exact composition depends on the application. The silica sand is typically derived from either alluvial deposits or crushed from a quartzite quarry. The appearance of the sand is white with a small amount of colored material being acceptable. The size of the sand particles depends upon the desired characteristics of the cementious material. The ethyl cellulose ether, Walocel MKX 40000-Bayer serves as a thickening agent which enhances trowelability, open time, and set strength. The material is mixed 25 pounds dry material with 1 gallon of water. Mix thoroughly and let stand 5 minutes. Remix prior to use.

The intensity of the phosphorescence is increased by simply increasing its presence in the formulation.

EXAMPLE 2

Thin Set

| | |
|---|---|
| 62 | parts by weight silica sand |
| 37.2 | parts by weight Portland cement, gray or white |
| 0.2 | parts by weight ethyl cellulose ether (thickener) |
| 10 | part by weight rare earth doped calcium aluminate (phosphorescent pigment) |

EXAMPLE 3

Stucco

| | |
|---|---|
| 17.9 | parts by weight white cement |
| 10.7 | parts by weight lime, CaO |
| 33.3 | parts by weight blended silica sands |
| 38 | parts by weight calcium carbonate |
| 0.07 | parts by weight calcium sterate |
| 1 | parts by weight phosphorescent pigment |

Add sufficient clean cool water to dry mix to form a smooth trowelable mix. Stir occasionally during use.

EXAMPLE 4

Polymer Modified Thin Set

| | |
|---|---|
| 37.5 | parts by weight white cement |
| 55 | parts by weight silica sand |
| 0.25 | parts by weight Walocel (Thickener) |
| 4.3 | parts by weight white clay |
| 1 | parts by weight gypsum (hydrated) |
| 2 | parts by weight Vinyl Acetate/Ethylene Redispersible Powder (VAc/E) |
| 1 | parts by weight phosphorescent pigment |

Add 1.5 gallon of cool, clean water to 50 pounds dry material to obtain a smooth trowelable mix. Thoroughly mix. Let stand 5 to 10 minutes, then remix. Sir occasionally during use. Modification will also extend to the use of acrylic additives.

EXAMPLE 5

Pool Plaster

| | |
|---|---|
| 34.2 | parts by weight white cement |
| 0.3 | parts by weight fiber |
| 0.2 | parts by weight vinyl Acetate/Ethylene Redispersible Powder |
| 57 | parts by weight silica sand |
| 8.4 | parts by weight colored silica sand |
| 10 | parts by weight phosphorescent pigment |

A variation of the above formulation is to coat the colored silica aggregate with the phosphorescent pigment.

EXAMPLE 5A

Pool Plaster

| | |
|---|---|
| 34.2 | parts by weight white cement |
| 0.3 | parts by weight fiber |
| 0.2 | parts by weight Vinyl Acetate/Ethylene Redispersible Powder |
| 57 | parts by weight silica sand |
| 8.4 | parts by weight colored phosphorescent silica sand |

The difference being the effect. In Example 5 the phosphorescent is uniformly distributed throughout the pool plaster. In Example 5A, the phosphorescent is limited to the colored aggregate in the pool plaster created a speckled effect. The amounts of the coated aggregate can be increased with a decrease in the silica sand. The intensity of the phosphorescent depends on the concentration of the phosphorescent pigment used in the coating process. The mixing directions for the pool plaster are similar to those above.

EXAMPLE 6

Grout

| | |
|---|---|
| 34.2 | parts by weight white cement |
| 0.3 | parts by weight Walocel |
| 0.2 | parts by weight Vinyl Acetate/Ethylene Redispersible Powder |
| 57 | parts by weight silica sand |

-continued

| | |
|---|---|
| 2 | parts by weight pigment, Bayer iron oxide pigments, titanium dioxide, phthalo blues and greens |
| 10 | parts by weight phosphorescent pigment |

EXAMPLE 7

Polymer Modified Grouts

| | |
|---|---|
| 5 | parts by weight epoxy hardener |
| 69 | parts by weight silica sand |
| 2.9 | parts by weight hydroxy modified resin - To improve flow (Neville) |
| 1.1 | parts by weight curing agent (Air Products) |
| 19 | parts by weight epoxy resin |
| 0.9 | parts by weight fumed silica (Cabosil) |
| 1.7 | parts by weight titanium dioxide |
| 10 | parts by weight phosphorescent pigment |

The titanium dioxide imparts the white coloration to the epoxy grout and also enhances the phosphorescence by whitening the materials and increasing its reflectivity. This is an important distinction of the epoxy overlay material described in U.S. Pat. No. 6,005,024 which desired transparent or translucent characteristics to the material so as to be used as a marking overlay material. Here the epoxy grout serves as both the tile setting material and the visible material between tiles. The phosphorescence is not simply overlaying the grout but is part of the grout itself. Transparency is not desired as silica encased in epoxy is not a desired aesthetic effect of the tile grout. Non phosphorescent pigments can also be incorporated into the above formulation to color the grout to create a color match or pleasing contrast to the tile. The phosphorescent pigment will impart no effect in visible light and will only be apparent in darkness or low light level environments. This formulation also extends to other epoxy, acrylic and polycarbonate polymeric materials which may be used to extend ranges of stain resistance, hardness and appearance. A mildicide or bacteroicide may also be included to reduce the growth of microbes and fungus on the surface of the grout.

EXAMPLE 8

Self Leveling Compound

| | |
|---|---|
| 9.6 | parts by weight calcium aluminite cement (SECAR 51/SECAR 71) |
| 28.8 | parts by weight white or gray cement |
| 1.2 | parts by weight plastisizer (Melment F-10) |
| 7.7 | parts by weight metakaolin clay (MetaMax) |
| 4.8 | parts by weight VAc/E redispersable powder (RP224 - Wacker) |
| 3.3 | parts by weight defoamer |
| 44.2 | parts by weight silica sand |
| 0.5 | parts by weight lithium carbonate |
| 2 | parts by weight nonphosphorescent pigments |
| 10 | parts by weight phosphorescent pigments |

Sufficient water is added to create a liquid with a viscosity similar to that of a milk shake. The compound is then applied to a surface where it seeks to spread out, leveling the surface. The material dries and hardens quickly.

EXAMPLE 9

Cement Patch

| | |
|---|---|
| 55.5 | parts by weight type III cement |
| 5 | parts by weight fondue cement |
| 14 | parts by weight calcium aluminite cement (SECAR 51/SECAR 71) |
| 0.5 | parts by weight lithium carbonate |
| 0.2 | parts by weight sodium citrate |
| 0.1 | parts by weight thickener (Walocel) |
| 4.44 | parts by weight VAc/E Redispersible powder (RP 2010-Wacker) |
| 6.65 | parts by weight fine silica sand |
| 10 | parts by weight phosphorescent pigment |

The cement patch is mixed with enough water to create a creamy consistency. The material is spread over the surface. It can be used to fill cracks, level the surface or finish to a feather edge. Again use of other non-phosphorescent pigments as colorants is covered by this formulation.

EXAMPLE 10

Concrete Surfacing Compound

| | |
|---|---|
| 49 | parts by weight white cement |
| 2 | parts by weight gray cement |
| 49 | parts by weight silica sand |
| 5 | parts by weight VAc/E Redispersible powder |
| 2 | parts by weight non-phosphorescent pigment |
| 10 | parts by weight phosphorescent pigment |

The dry material is mixed with enough cool, clean water to create a smooth flowing liquid with a flow similar to that of a milk shake. The material can be applied by broom, brush, trowel, or sprayed from a hopper gun. Typically applied as a thin coating over an existing concrete slab.

What is claimed is:

1. A phosphorescent pigment modified cementitious material comprising a Portland cement and mixed in said cement, a rare earth doped calcium aluminate phosphorescent pigment that produces a long lasting phosphorescence for up to 8 hours in the visible portion of the spectrum after exposure to a radiation source.

2. The phosphorescent pigment modified cementitious material of claim 1, further comprising a non-phosphorescent pigment.

3. A phosphorescent pigment modified cementitious material according to claim 1 consisting essentially of 62 parts by weight silica sand; 37.2 parts by weight Portland cement, gray or white; 0.2 parts by weight ethyl cellulose ether; and 1 part by weight rare earth doped calcium aluminate phosphorescent pigment.

4. A phosphorescent pigment modified cementitious material according to claim 1 consisting essentially of 62 parts by weight silica sand; 37.2 parts by weight Portland cement, gray or white; 0.2 parts by weight ethyl cellulose ether thickener; and 10 parts by weight rare earth doped calcium aluminate phosphorescent pigment.

5. A phosphorescent pigment modified cementitious material according to claim 1 consisting essentially of 17.9 parts by weight white cement; 10.7 parts by weight lime, CaO; 33.3 parts by weight blended silica sands; 38 parts by weight calcium carbonate; 0.07 parts by weight calcium sterate; and 1 part by weight phosphorescent pigment.

6. A phosphorescent pigment modified cementitious material according to claim 1 consisting essentially of 37.5 parts by weight white cement; 55 parts by weight silica sand; 0.25 parts by weight thickener; 4.3 parts by weight white clay; 1 part by weight gypsum; 2 parts by weight Vinyl Acetate/Ethylene Redispersible Powder; and 1 part by weight phosphorescent pigment.

7. A phosphorescent pigment modified cementitious material according to claim 1 consisting essentially of 34.2 parts weight white cement; 0.3 parts by weight fiber; 0.2 parts by weight Vinyl Acetate/Ethylene Redispersible Powder; 57 parts by weight silica sand; 8.4 parts by weight colored silica sand; and 10 parts by weight phosphorescent pigment.

8. A phosphorescent pigment modified cementitious material according to claim 1 consisting essentially of 34.2 parts by weight white cement; 0.3 parts by weight fiber; 0.2 parts by weight Vinyl Acetate/Ethylene Redispersible Powder; 57 parts by weight silica sand; and 8.4 parts by weight colored phosphorescent silica sand.

9. A phosphorescent pigment modified cementitious material according to claim 1 consisting essentially of 34.2 parts by weight white cement; 0.3 parts by weight ethyl cellulose ether; 0.2 parts by weight Vinyl Acetate/Ethylene Redispersible Powder; 57 parts by weight silica sand; 2 parts by weight pigment, iron oxide pigments, titanium dioxide, phthalo blues and greens; and 10 parts by weight phosphorescent pigment.

10. A phosphorescent pigment modified cementatious material according to claim 1 consisting essentially of 5 parts by weight epoxy hardener; 69 parts by weight silica sand; 2.9 parts by weight hydroxy modified resin; to improve flow; 1.1 parts by weight curing agent; 19 parts by weight epoxy resin; 0.9 parts by weight fumed silica; 1.7 parts by weight titanium dioxide; and 10 parts by weight phosphorescent pigment.

11. A phosphorescent pigment modified cementitious material according to claim 1 consisting essentially of 9.6 parts by weight calcium aluminite cement; 28.8 parts by weight white or gray cement; 1.2 parts by weight plastisizer; 7.7 parts by weight metakaolin clay; 4.8 parts by weight redispersable powder; 3.3 parts by weight defoamer; 44.2 parts by weight silica sand; 0.5 parts by weight lithium carbonate; 2 parts by weight non-phosphorescent pigment; and 10 parts by weight phosphorescent pigments.

12. A phosphorescent pigment modified cementitious material according to claim 1 consisting essentially of 55.5 parts by weight type III cement; 5 parts by weight fondue cement; 14 parts by weight calcium aluminite cement; 0.5 parts by weight lithium carbonate; 0.2 parts by weight sodium citrate; 0.1 parts by weight thickener; 4.44 parts by weight Redispersible powder; 6.65 parts by weight fine silica sand; and 10 parts by weight phosphorescent pigment.

13. A phosphorescent pigment modified cementitious material according to claim 1 consisting essentially of 49 parts by weight white cement; 2 parts by weight gray cement; 49 parts by weight silica sand; 5 parts by weight Redispersible powder; 2 parts by weight non-phosphorescent pigment; and 10 parts by weight phosphorescent pigment.

* * * * *